United States Patent [19]

van Linden et al.

[11] 3,997,336

[45] Dec. 14, 1976

[54] METAL SCRAP MELTING SYSTEM

[75] Inventors: Jan H. L. van Linden, Allison Park; Joseph R. Herrick, Verona; Michael J. Kinosz, Apollo, all of Pa.

[73] Assignee: Aluminum Company of America, Pittsburgh, Pa.

[22] Filed: Dec. 12, 1975

[21] Appl. No.: 640,052

[52] U.S. Cl. .............................. 75/68 R; 75/65 R; 266/235; 266/901

[51] Int. Cl.² ....................................... C22B 21/00

[58] Field of Search ............ 75/65, 68 R; 266/235, 266/901

[56] References Cited

UNITED STATES PATENTS

| | | | |
|---|---|---|---|
| 1,513,875 | 11/1924 | Wilke | 266/901 |
| 1,679,385 | 8/1928 | Stay et al. | 266/901 |
| 1,797,276 | 3/1931 | Stay et al. | 266/901 |
| 2,793,852 | 5/1957 | Harrison | 266/901 |
| 3,873,305 | 3/1975 | Claxton et al. | 75/68 R |

*Primary Examiner*—M. J. Andrews
*Attorney, Agent, or Firm*—Andrew Alexander

[57] ABSTRACT

A system for melting metal scrap in a molten melting media comprises a housing having an upper portion wherein the melting media and scrap are brought together to initiate melting. The housing also has a lower portion in which a volute is located. An impeller, having a central hub, a circumferential band surrounding the hub, and canted vanes projecting radially from the hub to the band, is positioned in the lower portion of the housing to cooperate with the volute so that upon rotation of the impeller, metal scrap and melting media are moved downwardly and out of the housing.

22 Claims, 6 Drawing Figures

METAL SCRAP MELTING SYSTEM

BACKGROUND OF THE INVENTION

This invention relates to a scrap reclamation system and in particular to a method and apparatus for quickly and efficiently melting metal scrap in a recirculating melting system.

Increased effort is being placed on finding cheaper methods to recycle metal scrap, particularly in the light metals field. This effort is being expended because of the national and international concern over depletion of raw material sources needed to manufacture these metals.

Recycling systems for metal scrap are normally required to be at least competitive with established manufacturing systems for producing such metal. To be competitive, such recycling systems must be efficient which can often require that they be designed to reclaim certain or specific kinds of metal scrap. With respect to the kinds of metal scrap encountered in the light metals field, particularly aluminum, it should be observed that it can range from scrap generated very early in the manufacturing process to that resulting from used products, e.g. metal containers. Scrap generated early in the manufacturing of aluminum, for example, is scalping chips. These chips result from preparing the surface of an aluminum ingot for rolling or cladding or some such purpose when often large irregularities are removed. Chips removed at this time can constitute as much as 6% of the total metal in the ingot and therefore obviously can amount to a considerable amount of metal which can be recyled. Scrap typical of used metal containers which can be beneficial to recycle is metal beverage cans and the like. Recycling such cans serves to conserve resources and also to provide a cleaner environment.

These two types of scrap are often considered to present different problems from the standpoint of reclamation. For example, container or can scrap normally comprises bits and pieces of metal which can range in size from relatively small particles to crushed cans. Often the cans have holes pierced in them for purposes of delacquering using solvents. The pierced holes, while aiding the flow of solvent through the mass of cans, result in jagged edges which, together with the generally non-uniform shapes and sizes of crushed cans, make this scrap relatively non-flowable. Furthermore, such scrap tends to be rather buoyant with respect to the melting media, requiring special equipment to forcibly submerge it. A particular type of equipment for handling this type of scrap is disclosed in U.S. Pat. No. 3,873,305 where a rotating wedge forcibly submerges this type of scrap into the melting media. In the system described in this patent additional equipment is required to re-circulate the molten melting media.

With respect to the scalping chips, or scrap which may be characterized as flowable, for example, such as filings and cuttings or even large pieces these often do not present great difficulty in submerging as does the above-mentioned container scrap. Nevertheless, it is imperative that such flowable scrap be melted and reclaimed in the most efficient manner in order to provide an incentive to operate a remelting system as a source of metal, as compared to the established manufacturing system for producing such metal.

With highly oxidizable metals, such as aluminum, out of which the aforementioned containers and beverage cans are often made, it is important to provide a remelting system which provides maximum heat transfer for efficient melting. Also, it is important that the metal scrap be submerged with minimum turbulence at the melting media surface in order to minimize oxidation of the molten metal. Oxidation leads to skim formation, a problem inherent in most systems reclaiming highly oxidizable metals such as aluminum.

The skim referred to includes the metal oxide, e.g. $Al_2O_3$, and molten metal which becomes entrained in such oxide. Skim is undesirable and therefore should be minimized not only because of the molten metal lost to it, but also because it can cause problems by acting as an insulator in the heating bay. That is, when combustion units discharging their heat on the surface of the molten media in the heating bay are used, skim floating on the surface thereof makes it difficult to heat the molten media. Also, such floating skim be rejecting heat can seriously shorten the useful life of the equipment by causing it to overheat.

The present invention provides a highly efficient method for reclaiming metal scrap in a recirculating melting system. This method is suitable for reclaiming either flowable or non-flowable scrap of the type referred to above, is highly efficient and generates minimum skim.

STATEMENT OF THE INVENTION

A principal object of the present invention is to provide an inexpensive, highly efficient recirculating melting system for reclaiming metal scrap.

Another object of the present invention is to provide a metal scrap reclamation system wherein pumping of the melting media, scrap charging, and substantial melting of the scrap may be accomplished at one station.

These and other objects will become apparent from a reading of the disclosure and claims and an inspection of the accompanying drawing appended hereto.

In accordance with these objectives, there is disclosed a system for melting metal scrap in a molten melting media. The system includes a housing having upper and lower portions therein which are generally circular in cross section. Scrap is added to a body of melting media in the upper portion to initiate melting. In the lower portion of the housing is a volute and positioned to cooperate with the volute is an impeller, so that upon its rotation, as well as continuously depleting and replenishing the body of melting media, scrap and melting media are moved downwardly and out of the housing. The impeller has a hub, a circumferential band and canted vanes projecting from the hub to the band, defining openings in the impeller through which unmelted scrap and melting media pass. Thus, in operation of the system, scrap is contacted by the melting media in the upper portion of the housing to initiate melting, thereafter the combination is moved downwardly and out of the housing by action of the rotating impeller.

BRIEF DESCRIPTION OF THE DRAWINGS

In the description below, reference is made to the following drawings in which.

DETAILED DESCRIPTION OF THE PREFERRED EMBODIMENTS OF THE INVENTION

Figure 1:
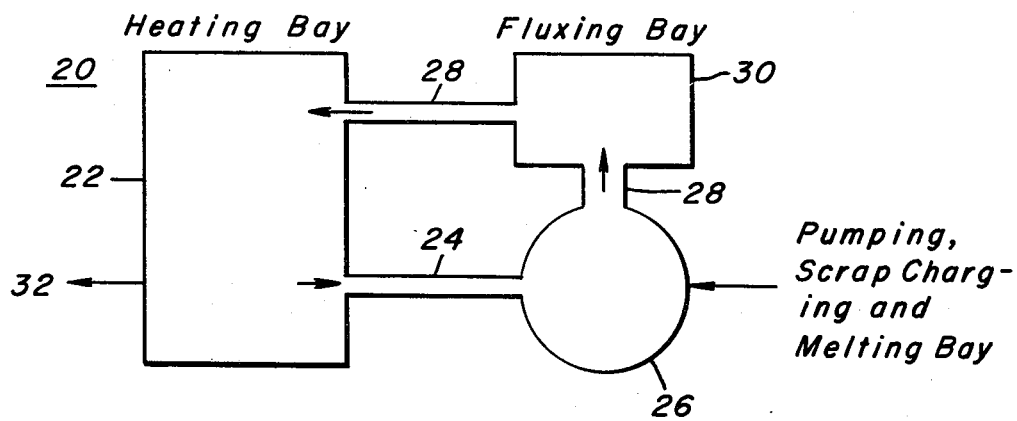
FIG. 1 is a plan view showing a general schematic of a circulatory melting system in accordance with the present invention.

Referring now more specifically to FIG. 1, there is shown a schematic of a circulatory melting system 20 incorporating the present invention. In the circulatory melting system 20, molten melting media is circulated from the heating bay 22 along line 24 to a bay 26 wherein pumping, scrap charging and melting is accomplished simultaneously. Thereafter, the melt is circulated back to the heating bay 22 via line 28 which can pass through a fluxing bay 30. The heating bay can have a discharge line 32 which in the circulatory system can discharge molten metal at a rate commensurate with the feed rate of scrap to bay 26. This type of circulatory system is highly efficient in its use of heat input and in its freedom from skim generation, particularly when used in conjunction with fluxing bay 30.

The melting media may be heated in heating bay 22 by combustion units discharging their heat upon its surface. Alternatively, electric resistance heaters immersed in the molten media may be used.

The melting media can be molten metal of similar composition to the metal charge or it may be a molten salt. If a molten salt is used, a salt-metal separation would normally be necessary to facilitate the removal of the melted metal. When molten aluminum is the melting media, a typical temperature leaving the heating bay 22 is about 1400° F although this temperature can range from 1325° to 1475° F but with a higher temperature there is a greater tendency to form skim. A typical temperature re-entering heating bay 22 is about 1300° F. This provides about a 100° F temperature drop across the melting bay to provide heat to melt the charge.

Figure 2:
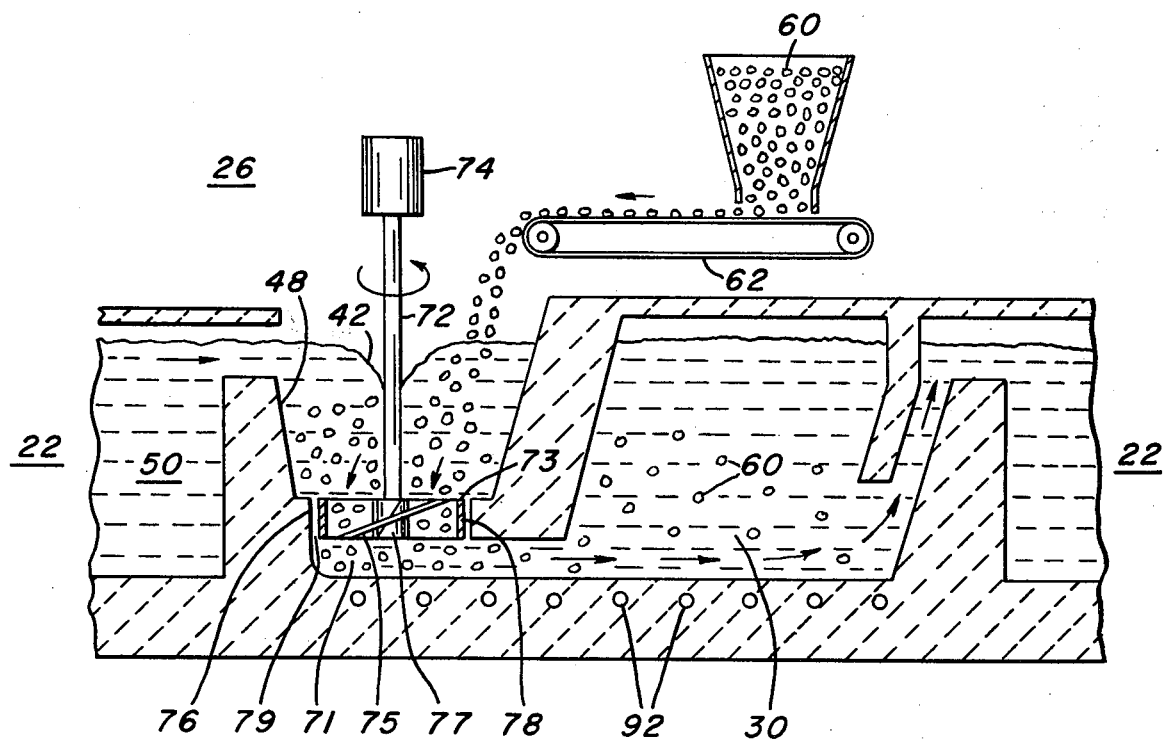
FIG. 2 is an elevation view in cross-section illustrating a bay in the melting system wherein scrap charging, melting and pumping of the melting media is accomplished more or less simultaneously.

Referring now to FIG. 2, in accordance with the present invention, there is shown bay 26 which allows for charging scrap 60 for circulating the molten melting media 50 and partially melted scrap, and for fluxing, if necessary, all of which can be accomplished simultaneously. Thus, bay 26, which is preferably generally circular in cross section and has a preferably downwardly converging wall 48, acts as a melting area, a charging area, and a pumping zone, and if desirable, an area where fluxing can be initiated.

In operation, molten melting media 50 is circulated from heating bay 22 to bay 26 and back to the heating bay by means of a rotating impeller, generally referred to as 73, which action continuously depletes and replenishes the body of molten melting media in bay 26. Scrap is fed from hopper 60 along an endless belt 62 into bay 26 where impeller 73, as well as providing circulation in the system, pulls or draws molten melting media 50 and scrap 60 downwardly in bay or housing 26. The combination of melting media and unmelted metal passes through impeller 73 and volute section 71 even though the scrap may be only partially melted on passing therethrough. The combination can then pass to bay 30 for further fluxing, if desired, and back to heating bay 22 with solid material being melted as the combination is circulated.

Figure 3:
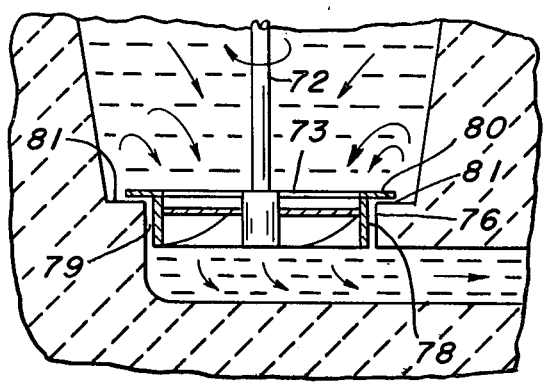
FIGS. 3 and 4 are elevation views in cross section illustrating preferred embodiments of the bay in FIG. 2.

The impeller 73 is carried on shaft 72 and is positioned in the volute section 71 of bay 26. The impeller 73 is rotated by shaft 72 driven by means 74 which is suitably an electric or air motor. Impeller 73 has blades 75 projecting from a hub 77 to an encircling or circumferential band 78. The blades 75 and band 78 are designed to provide axial flow therethrough. Thus, scrap particles 60 not already melted will follow the molten media flow through the openings defined by the blades 75 and band 78. As a consequence, metal scrap particles do not become wedged or jammed between the band 78 and volute wall 76. Preferably, band 78 has a circumferential rim or flange section 80 mounted thereon which extends radially outwardly from band 78 over volute wall 76 as can best be seen in FIG. 3. Rim or flange section 80 is positioned over the volute wall 76 to provide less of a direct annular gap 79 to approaching scrap pieces and thus even less of a chance of jamming or wedging of scrap pieces in the gap.

Figure 4:
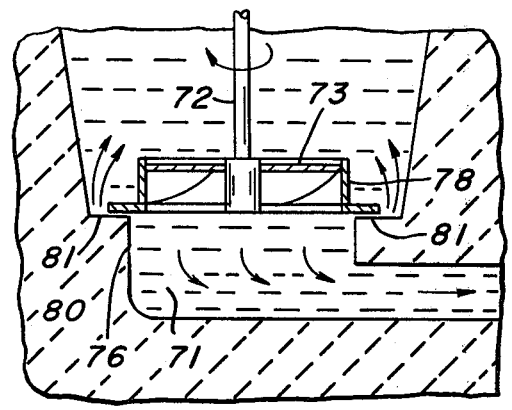

FIG. 4 depicts a highly preferred form of the invention. Impeller 73, which is substantially the same as described above except for the location of flange section 80, is positioned over volute section 71 to cooperate therewith so as to pass unmelted scrap and melting media without jamming. As noted above, band 78 has a flange section 80 mounted thereon which projects radially from band 78 over volute wall 76. Also, as noted above, flange section 80 prevents unmelted scrap from becoming wedged between the impeller and the volute wall. This form of the invention is advantageous in that positioning impeller 73 with respect to volute wall 76 is less critical than with the FIG. 3 arrangement and thus provides for ease of properly positioning the impeller to cooperate with the volute, especially if bay 26 contains molten metal. For example, in replacing impeller 73, it can be positioned by lowering to the point where rim section 80 touches top 81 of volute wall 76 and then withdrawn approximately 1/4 inch or as desired. The impeller in the FIG. 3 arrangement can be positioned similarly except care must be taken to ensure that the impeller is centered within the volute section.

Thus, imeller 73 and its cooperation with volute section 71 is an important aspect of this invention because it can operate to circulate the molten melting media, including unmelted scrap, and yet surprisingly remain substantially jam free. As noted, it is carefully positioned with respect to volute section 71 such that it will pass unmelted scrap 60 without becoming jammed or wedged.

One reason that unmelted scrap pieces do not jam the impeller seems to reside in the fact that pressure under impeller 73 is greater than that above it. Hence, because the flow of melting media is through the impeller, there appears to be substantially no axial flow through gap 79 as defined by volute wall 76 and band 78. It has even been speculated that there may even be slight back flow through gap 79 resulting from the difference in pressure. In any event, since the flow is primarily axial through impeller 73, there is virtually no force to cause unmelted scrap pieces to flow in the direction of gap 79 and to become jammed or wedged therein. Even though the flow through the impeller is primarily axial, band 78 ensures that unmelted particles which may be forced radially do not become jammed between the impeller blades and volute wall 76.

In operation, impeller 73 can be rotated at a high rate of rotation depending largely on the amount of molten melting media to be circulated. Also, the pitch of the blades 73 can be large or small depending again on the circulation rate desired. Preferably, the impeller is rotated relatively slowly to prevent excessive vortexing and the formation of skim and its attendant problems. Hence, a preferred rotation speed is about 50–200 rpm when molten aluminum is the melting media.

In addition to the above noted rotational speeds, it is important that the impeller 73 be completely submerged in the body of molten melting media contained in bay 26. Furthermore, particularly when the melting media is molten aluminum, it is important that impeller 73 be submerged to a predetermined minimum depth in order that the scrap be efficiently submerged or ingested. Thus, working within the rotational speeds indicated above, a 9-inch diameter impeller should be submerged to a depth in the range of 5 to 15 inches with a suitable depth being 10 inches of molten metal above the impeller. In the case of a 20 inch diameter impeller, the depth of molten metal should be in the range of 9 to 30 inches with 20 inches being quite suitable. With these molten metal depths and impeller rotational speeds, the ratio of the diameter of the bay 26 containing molten metal to the diameter of the impeller normally should not be more than 3:1.

Figure 5:
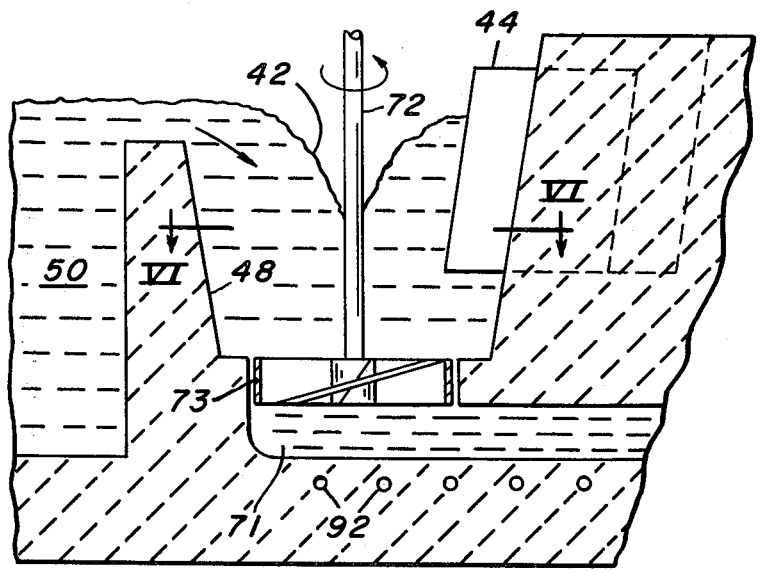
FIG. 5 is an elevation view in cross section depicting a baffle for controlling the vortex in the bay of FIG. 2.
Figure 6:
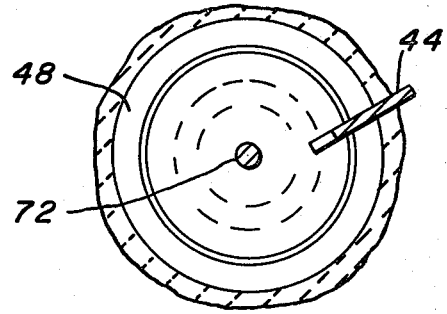
FIG. 6 is a plan view taken along line VI—VI of FIG. 6.

Impeller 73 by virtue of its depth and rotational speed creates a molten metal vortex 42 in bay 26. The vortex is effective in forcibly submerging or ingesting metal scrap into the molten metal but it is important that it be controlled by working substantially within the depths and rotational speeds just noted. If the rotational speeds are substantially greater than those indicated or greater than those required to ingest the scrap into the molten metal, excessive vortexing can occur. Excessive vortexing is characterized by an undue amount of turbulence at the molten metal surface which turbulence can result in the formation of skim and its attendant problems. Thus, excessive vortexing is best avoided. However, if a circulation rate is required which would result in this type of vortexing, it can be controlled by use of baffle 44 as can best be seen in FIGS. 5 and 6. Baffle 44, which can be moved in a radial direction in and out of bay 26 by any conventional means (not shown), controls the extent of the vortex, particularly at high circulation rates. For example, if the vortex becomes too deep and the surface of the molten metal exhibits undue turbulence, baffle 44 can be moved out into bay 26, thereby decreasing the depth of the vortex and minimizing the extent of the turbulence, yet maintaining substantially the same flow rate of molten metal through bay 26. Also, the likelihood of skim formation is decreased.

The amount of scrap recovered in the subject invention can vary widely depending largely on the size of the equipment. Its capability for reclaiming scrap metal is illustrated by the following example. A 9-inch diameter impeller can be operated to provide a circulatory flow rate of about 100,000 lbs./hr. of molten aluminum in this system. Thus, in providing 20 lbs. of molten media to melt 1 lb. of scrap, 5000 lbs. of metal scrap can be recovered per hour. However, metal scrap recovery rates contemplated are 50,000 lbs./hr. or higher depending on the size of the equipment. Also, the rate of flow of the melting media can be 10 to 50 times the rate of flow of the scrap.

By inspection of FIGS. 2, 3, 4 and 5, it will be observed that impeller 73 can be withdrawn upwardly out of volute 71 with any one of a number of systems suitable for that purpose. Hence, if the impeller wedges or jams or otherwise becomes inoperable, it can be replaced very quickly and thus in a recirculatory system such as this, there is a certain degree of freedom from concern over freezing of the melting media. Also, an additional feature which is quite important in this respect is the fact that the shaft and the impeller can be made from the same materials, allowing the impeller to be submerged rather quickly without adversely affecting it by thermal expansion.

The melting system as presently set forth provides a great deal of flexibility in operation by offering the use of convenient control features. For instance, the melting rate of scrap in the melting media can be easily adjusted to provide maximum melting rate without fear of freezing of the melting media. By obtaining the temperature of the melt as it enters and leaves heating furnace 22, it can be determined whether the feed rate of scrap or of the molten melting media to the bay 26 should be increased or decreased. Thus, maximum melting capacity can be obtained at all times.

In the invention as presently set forth, it is preferred to avoid extensive scrap accumulation on the surface of the molten melting media in bay 26. Rather, it is preferred to have the scrap consumed more or less as it is discharged from the conveyor belt into the melting media. Having an accumulation of scrap in bay 26 can lead to bridging of bay 26 by the scrap and in certain instances freezing of the scrap in this position. Also, accumulation of scrap in bay 26 can be detrimental to the operation of the impeller, since relatively large masses of scrap can interfere with its operation. Thus, while some accumulation can be tolerated, it is preferred that the discharge rate of scrap feed be synchronized with that of the rate of flow of the molten melting media such that virtually no accumulation takes place. If accumulation is observed, it may be remedied by increasing the rpm of the impeller thereby causing greater flow of molten melting media. Alternatively, the rate of scrap feed can be decreased or a combination of these may be used.

In the present system, materials of construction of bay 26 can be any material suitably resistant to erosion or corrosion by molten aluminum or molten salts. Such materials include silicon carbide or any other refractory normally used with molten aluminum. With respect to the impeller, since dimensions can be relatively imprecise when compared to pumps normally used to pump molten metals, e.g. no seals, etc., the impeller, shaft, band and rim can be fabricated as a unit. For example, if the fabricating material is silicon carbide, it can be cast. Alternatively, if the fabricating material is graphite, the impeller assembly can be conveniently machined.

In reclaiming aluminum scrap, when it is desired to remove impurities such as entrapped gases, e.g. hydrogen, oxide particles or sodium, the molten materials can be passed through a fluxing bay as indicated in FIG. 2. It can be advantageous to remove these impurities by treating the melting media and the scrap at the earliest possible time and, accordingly, fluxing may begin in the pumping, charging and melting bay 26. The fluxing gas can be thoroughly mixed and distributed through the molten aluminum by introducing it down a hollow shaft 72 and out through radial holes in the hub of impeller 73. In this way, molten melting media, partially melted scrap, and fluxing gas are swept into fluxing bay 30 where skim may be removed or additional fluxing may be performed, or both. As well as providing the fluxing gas through the impeller, it may be supplied through openings 92. Fluxing gases suitable for molten aluminum include the so-called inert gases, namely helium, neon, argon, krypton, xenon, along with nitrogen, carbon dioxide, and mixtures of these gases along with mixtures of these gases with a chlorinaceous gas such as chlorine.

With reference to the scrap metal to be reclaimed, preferably it should be rendered more of less flowable. Scrap in a flowable condition such as scalping chips, filings, cuttings or container scrap which has been shredded, is most suitable for use in the present invention and can be melted at a surprisingly high rate. Obviously, the size of the particles are, in reality, only limited by the size of the system which can be designed to consume relatively large pieces of metal scrap. The present system is not limited by factors such as density of the scrap being reclaimed. Whether the scrap being charged has a tendency to float does not appear to offer any problems since such scrap is quickly submerged or consumed in the flow of molten melting media and thereafter discharged into the fluxing bay 90.

As mentioned earlier, the present system is highly efficient in that it does not generate much skim or provide much melt loss. For instance, when scalping chips were remelted by several different methods, the present system was found to offer the lowest skim generation and melt loss at comparative feed rates. For example, when the scalping chips were remelted by charging them batchwise into an open hearth furnace, the skim and melt loss was 10–12% and 6.5–8%, respectively. The skim and melt losses in a cascade system were 6.0–10% and 4–6.5%, respectively. In the present system, skim generation is only 2–5% and melt loss 2–3.5% obviously showing a large improvement over the other systems.

While the invention has been described with reference to aluminum, it is to be understood it can have application to recovery of other metals including for example magnesium, brass, zinc, copper, etc., and mixtures of these. Also, while the invention has been described mainly with reference to a recirculating system for recovery of metal scrap, it can have application in other systems. For example, it is suitable for circulating molten salts, such as cryolite, to an electrolytic cell used for the production of aluminum, for example, a Hall cell. In such application, the cryolite can be circulated from the cell to a station, e.g. bay 26, where its concentration is replenished and thereafter back to the cell by which operation the cell is made more efficient by having a more uniform concentration of cryolite. Also, the invention can have application in the so-called open-hearth furnace where the metal is generally heated by combustion units discharging on the upper surface of the molten metal. Here, it is advantageous to circulate the relatively hot molten metal near the surface to the relatively cold areas near the bottom thus no longer depending merely on radiation through the melt.

While the invention has been described in terms of preferred embodiments, the claims appended hereto are intended to encompass all embodiments which fall within the spirit of the invention.

Having thus described the invention and certain embodiments thereof, what is claimed is:

1. A method of melting metal scrap in a molten melting media comprising:
   a. introducing a supply of said scrap to a housing having upper and lower portions with a volute located in said lower portion, said housing containing a body of molten melting media to initiate melting of said scrap therein, and
   b. continuously depleting and replenishing said body of molten melting media simultaneously with melting said metal scrap by downwardly discharging melting media and unmelted scrap out of said housing by action of an impeller rotating in said lower portion of said housing and cooperating with said volute, said impeller having a central hub, a circumferential band surrounding said hub, and canted vanes projecting radially from said hub to said band defining openings in said impeller through which said melting media and unmelted scrap pass as they move downwardly out of said housing.

2. The method according to claim 1 wherein said impeller is positioned to rotate in said volute, providing an annular gap between said band and said volute.

3. The method according to claim 2 wherein said band on said impeller has a circumferential flange section thereon extending radially outward over said annular gap to prevent unmelted metal scrap wedging in said gap.

4. The method according to claim 1 wherein said upper portion in said housing is downwardly converging.

5. The method according to claim 1 wherein said metal scrap is aluminum or aluminum alloys.

6. The method according to claim 1 wherein said melting media is molten aluminum.

7. The method according to claim 1 wherein said melting media is depleted and replenished at a rate of 10 to 50 times the rate of flow of said scrap.

8. The method according to claim 6 wherein said body is replenished with molten aluminum at a temperature in the range of 1325° to 1475° F.

9. The method according to claim 1 including the step of fluxing said melted scrap in said melting media by distributing a fluxing gas through holes in the impeller.

10. In an improved method of melting metal scrap in a recirculating system having a heating bay and a pumping bay wherein molten melting media is circulated from said heating bay to said pumping bay and back to said heating bay, said pumping bay having a housing having upper and lower portions therein of generally circular in cross section, said housing containing a body of melting media, said improvement comprising:
   a. introducing a supply of said scrap to the upper portion of said housing of said pumping bay to inititate melting of said scrap therein;
   b. simultaneously with melting said metal scrap, continuously depleting and replenishing said body of melting media by downwardly discharging melting media containing unmelted scrap out of said housing to said heating bay and by drawing melting media from said heating bay by action of an impeller rotating in said lower portion and cooperating with a volute therein said impeller having a central hub, a circumferential band, surrounding said hub, and canted vanes projecting radially from said hub to said band defining openings in said impeller through which a combination of said melting media and unmelted scrap pass as they discharge from said housing to said heating bay; and c. removing molten metal from said heating bay at a rate commensurate with introducing said supply of metal scrap to said pumping bay.

11. The method according to claim 10 wherein said impeller is positioned in said volute providing an annular gap between said band and said volute.

12. The method according to claim 11 wherein said band on said impeller has a circumferential member thereon extending radially outward over said gap thereby preventing unmelted metal scrap wedging in said gap.

13. The method according to claim 10 wherein said metal scrap is aluminum or aluminum alloys.

14. The method according to claim 10 wherein said melting media is molten aluminum.

15. The method according to claim 14 wherein said body is replenished with molten aluminum at a temperature in the range of 1325° to 1475° F.

16. The method according to claim 10 wherein said rotating action of said impeller induces said body of melting media in said housing to form a vortex to forcibly submerge said metal scrap.

17. The method according to claim 16 including controlling turbulence in said vortex by projecting a baffle into said melting media in said pumping bay.

18. The method according to claim 10 including the step of fluxing said melting media and said melted scrap by passing fluxing gas through said impeller to distribute said gas through said melting media and said melted scrap.

19. In an improved method of melting aluminum scrap in a recirculating system having a heating bay, a pumping bay and a fluxing bay wherein said system, molten aluminum at a temperature in the range of 1325° to 1475° F is circulated from said heating bay to said pumping bay and through said fluxing bay back to said heating bay, said pumping bay having a downwardly converging housing and having upper and lower portions therein generally circular in cross section and containing a body of molten aluminum, said improved method comprising:
 a. continuously introducing a supply of said scrap to the upper portion of said housing of said pumping bay to initiate melting of said scrap in said body of molten aluminum therein;
 b. simultaneously with melting said scrap, continuously depleting and replenishing said body of molten aluminum in said pumping bay by downwardly discharging molten aluminum containing unmelted scrap out of said pumping bay and by drawing melting media from said heating bay by action of an impeller rotating in said lower portion of said housing and cooperating with a volute therein, said impeller having a central hub, a circumferential band surrounding said hub and canted vanes projecting radially from said hub to said band, said action of said impeller creating a vortex in said body of molten aluminum to forcibly submerge said aluminum scrap;
 c. controlling turbulence in said vortex by a baffle projecting into said housing;
 d. fluxing said molten aluminum by distributing fluxing gas through holes in said impeller;
 e. passing said fluxing gas and said molten aluminum into a fluxing bay and thereafter into said heating bay; and
 f. removing molten metal from said heating bay at a rate commensurate with introducing said aluminum scrap to said pumping bay.

20. A system for melting metal scrap in a molten melting media comprises:
 a. a housing having upper and lower portions therein with a volute located in said lower portion, said housing adapted to contain a body of molten melting media to which a supply of said scrap can be added to initiate melting of said scrap therein; and
 b. an impeller positioned to rotate in said lower portion of said housing and to cooperate with said volute, said impeller having a central hub, a circumferential band surrounding said hub, and canted vanes projecting from said hub to said band defining openings in said impeller through which said melting media and unmelted scrap can pass as they move downwardly in said housing on rotation of said impeller.

21. An improved system for melting metal scrap in a recirculating loop having a heating bay and a pumping bay wherein molten melting media can be circulated from said heating bay to said pumping bay and back to said heating bay, wherein the improvement comprises:
 (a) a pumping bay comprising a housing having upper and lower portions therein of generally circular cross section, said housing adapted to contain a body of melting media, said housing further adapted to receive a supply of said scrap to the upper portion thereof to initiate melting of said scrap in said melting media; and
 (b) an impeller adapted to rotate in said lower portion and to cooperate with a volute therein, said impeller having a central hub, a circumferential band surrounding said hub, and canted vanes projecting from said hub to said band defining openings in said impeller through which a combination of said melting media and unmelted scrap can pass as they discharge from said housing to said heating bay on rotation of said impeller.

22. An improved system for melting aluminum scrap in a recirculating loop having a heating bay, a pumping bay and a fluxing bay wherein molten aluminum at a temperature in the range of 1325° to 1475° F can be circulated from said heating bay, to said pumping bay and back to said heating bay, wherein the improvement comprises:
 a. a pumping bay having a downwardly converging housing and having upper and lower portions therein generally circular in cross section, said housing adapted to contain a body of molten aluminum to which a supply of scrap can be added to initiate melting of scrap therein;
 b. an impeller positioned to rotate in said lower portion of said housing and to cooperate with a volute therein, said impeller having a central hub, a circumferential band surrounding said hub and canted vanes projecting from said hub to said band, said impeller on rotation thereof simultaneously with melting said scrap, continuously depleting and replenishing said body of molten aluminum in said pumping bay by downwardly discharging molten aluminum out of said pumping bay, said rotation of said impeller creating a vortex in said body of molten aluminum to forcibly submerge said aluminum scrap;
 c. a baffle projecting into said housing to control the extent of said vortex; and
 d. a fluxing bay positioned to receive said melted scrap and molten aluminum, said fluxing bay adapted to add fluxing gas to said molten aluminum to remove impurities therefrom.

* * * * *